United States Patent
Russell et al.

(10) Patent No.: US 9,383,630 B2
(45) Date of Patent: Jul. 5, 2016

(54) CAMERA MOUTH MOUNT

(71) Applicant: MyGo, LLC, San Diego, CA (US)

(72) Inventors: Jeffrey Mark Russell, Carlsbad, CA (US); Nicholas James Brooks, Carlsbad, CA (US)

(73) Assignee: MYGO, LLC, San Diego, CA (US)

( * ) Notice: Subject to any disclaimer, the term of this patent is extended or adjusted under 35 U.S.C. 154(b) by 0 days.

(21) Appl. No.: 14/639,040

(22) Filed: Mar. 4, 2015

(65) Prior Publication Data
US 2015/0253651 A1 Sep. 10, 2015

Related U.S. Application Data

(60) Provisional application No. 61/948,308, filed on Mar. 5, 2014.

(51) Int. Cl.
| | | |
|---|---|---|
| *A42B 1/24* | (2006.01) | |
| *A45B 11/04* | (2006.01) | |
| *A45F 3/14* | (2006.01) | |
| *G03B 17/56* | (2006.01) | |
| *F16M 13/04* | (2006.01) | |

(52) U.S. Cl.
CPC ............. *G03B 17/561* (2013.01); *F16M 13/04* (2013.01); *G03B 17/563* (2013.01)

(58) Field of Classification Search
CPC .............................. G03B 17/561; F16M 11/00
USPC ........................................................ 224/181
See application file for complete search history.

(56) References Cited

U.S. PATENT DOCUMENTS

| | | | | |
|---|---|---|---|---|
| 2,651,981 A | * | 9/1953 | Calhoun ................ | F16M 13/04 206/820 |
| 3,418,461 A | * | 12/1968 | Sedlock .................... | F21L 4/00 362/191 |
| 4,063,552 A | * | 12/1977 | Going .................. | A63B 71/085 128/861 |
| 4,776,792 A | * | 10/1988 | Wagner ................ | A61C 9/0006 433/37 |
| 5,487,662 A | * | 1/1996 | Kipke .................. | A61C 9/0006 433/215 |
| 5,499,633 A | * | 3/1996 | Fenton .................... | A61F 5/566 128/848 |

(Continued)

OTHER PUBLICATIONS

Holmgren, Nick, DIY GoPro Mouth Mount, Mar. 14, 2013, http://www.nordicsurfersmag.se/article/diy_gopro_mouth_mount.*

(Continued)

*Primary Examiner* — Nathan J Newhouse
*Assistant Examiner* — Jennifer N Zettl
(74) *Attorney, Agent, or Firm* — Coastal Patent Law Group, P.C.

(57) ABSTRACT

The disclosure concerns a camera mouth mount including a mouth piece coupled to a camera mount and configured for holding the camera mount with the mouth of a user. The mouth piece includes a pair of opposing bite supports extending from a proximal end to a distal end, the bite supports being connected at a junction disposed at the distal end. The camera mount is coupled to the junction of the bite supports. Various embodiments are described wherein a mouth piece is coupled to a camera mount. The camera mouth piece is used to hold a camera in ones mouth for the purpose of obtaining media while performing an activity such as surfing or another action sport.

22 Claims, 9 Drawing Sheets

(56) References Cited

U.S. PATENT DOCUMENTS

| | | | | | |
|---|---|---|---|---|---|
| 5,562,449 | A | * | 10/1996 | Jacobs | A61C 9/0006 433/214 |
| 5,836,878 | A | * | 11/1998 | Mock | A61B 90/16 433/24 |
| 5,860,754 | A | * | 1/1999 | Garland | B43K 23/004 401/6 |
| 6,098,627 | A | * | 8/2000 | Kellner | A61C 5/14 128/859 |
| 6,405,729 | B1 | * | 6/2002 | Thornton | A61F 5/566 128/206.29 |
| 8,014,656 | B2 | * | 9/2011 | Woodman | B63B 25/002 396/25 |
| 8,837,928 | B1 | * | 9/2014 | Clearman | E05B 17/2019 206/316.2 |
| 8,857,775 | B1 | | 10/2014 | Clearman et al. | |
| 8,870,475 | B1 | | 10/2014 | Bennett et al. | |
| 2001/0038998 | A1 | * | 11/2001 | Lindquist | A61C 19/063 433/215 |
| 2004/0103905 | A1 | * | 6/2004 | Farrell | A63B 71/085 128/861 |
| 2005/0113654 | A1 | * | 5/2005 | Weber | A61B 5/01 600/309 |
| 2005/0236003 | A1 | * | 10/2005 | Meader | A61F 5/566 128/848 |
| 2006/0174897 | A1 | * | 8/2006 | Sarkisian | A61F 5/566 128/859 |
| 2006/0219250 | A1 | * | 10/2006 | Farrell | A63B 71/085 128/859 |
| 2009/0221884 | A1 | * | 9/2009 | Ryan | A61B 5/682 600/301 |
| 2011/0185525 | A1 | * | 8/2011 | Stapelbroek | A61C 7/08 15/167.1 |
| 2012/0228528 | A1 | * | 9/2012 | Koo | A61B 1/0669 250/504 R |
| 2013/0066236 | A1 | * | 3/2013 | Herman | A63B 71/085 600/595 |
| 2014/0105589 | A1 | * | 4/2014 | Samuels | F16F 7/00 396/421 |
| 2014/0261461 | A1 | * | 9/2014 | O'Donoghue | A63B 71/085 128/861 |
| 2015/0076184 | A1 | * | 3/2015 | Achenbach | G03B 17/561 224/181 |

OTHER PUBLICATIONS

Wong, Elliot, How to Make a Mouth Mount for GoPro, Jul. 5, 2013, https://www.youtube.com/watch?v=gwrdNSpm54k.*

Pascoe, Ben, DIY GoPro Mouth Mount, Mar. 3, 2013, http://www.learningsurfphotography.com/how-to-diy-gopro-mouth-mount/.*

* cited by examiner

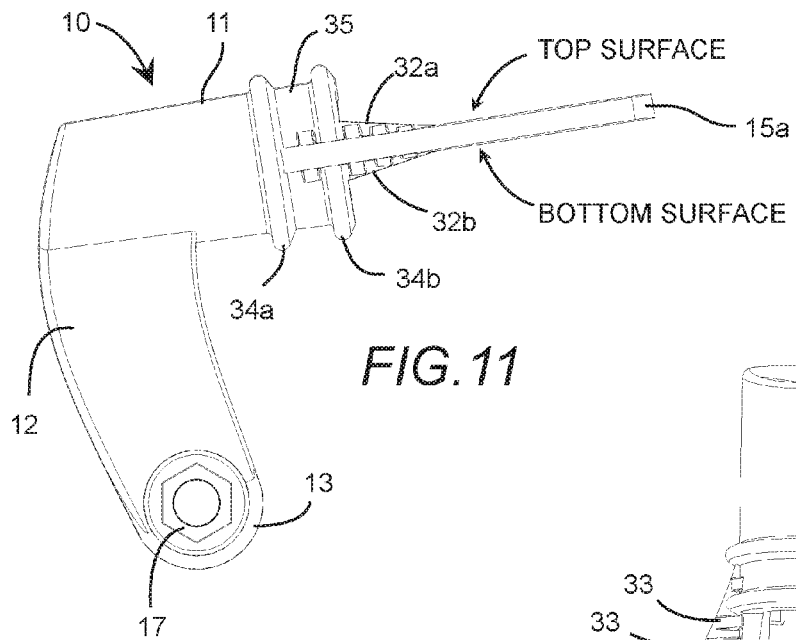
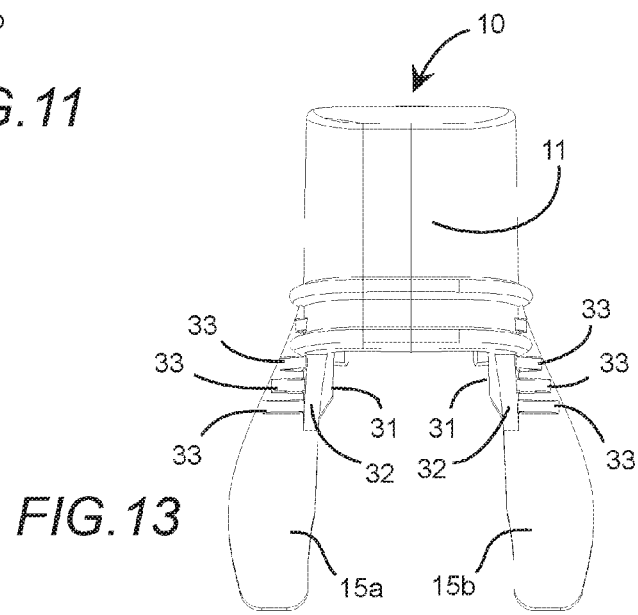
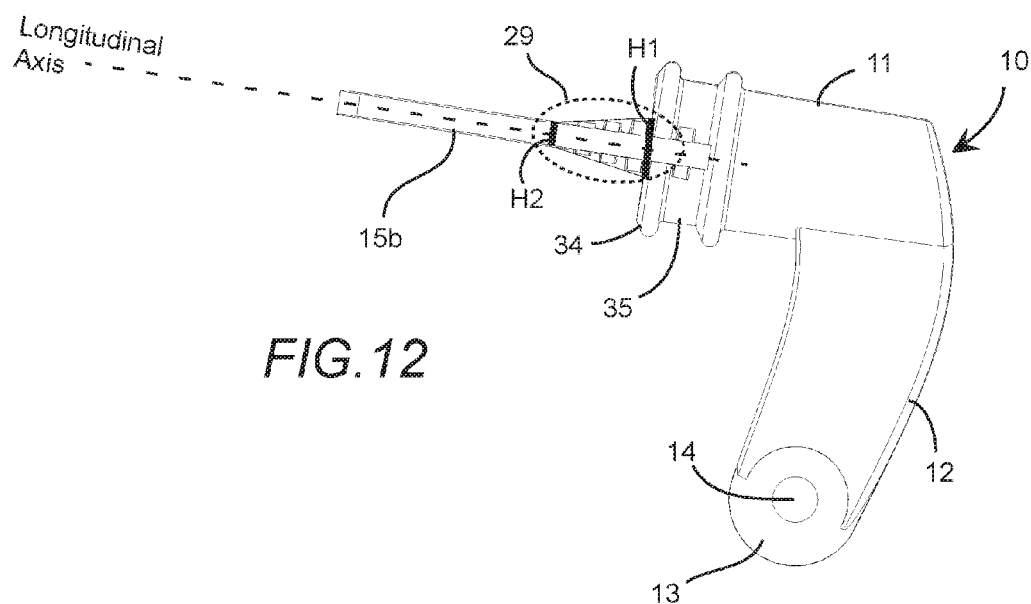

US 9,383,630 B2

CAMERA MOUTH MOUNT

CROSS-REFERENCE TO RELATED APPLICATIONS

This application claims benefit of priority with U.S. Provisional Application Ser. No. 61/948,308, filed Mar. 5, 2014; the contents of which are hereby incorporated by reference.

BACKGROUND

1. Field of the Invention

The invention relates to camera mounts; and more particularly, to a camera mount for action sports and related photography and videography wherein the mount is configured to be held with the mouth of a user.

2. Description of the Related Art

Modern versatile cameras, such as the GoPro® camera, are becoming widely popular among action sports enthusiasts. The GoPro® camera includes a unique housing as described in U.S. Pat. No. 8,837,928, issued Sep. 16, 2014; the contents of which are hereby incorporated by reference. The GoPro camera housing, as reproduced in FIG. 18 hereof, labeled as "prior art", includes one or more securing structures for securing the camera housing 100 to one of a variety of mounting devices. The camera housing 100 includes a second plurality of protrusions (protrusions 124 as shown in FIG. 17), and the mount includes a first plurality of protrusions. Each protrusion includes a hole (hole 126 as shown in FIG. 17) at a similar location within the protrusion such that the first and second pluralities of protrusions can interlock in such a way that the protrusion holes substantially align. Continuing with this example, a turnable handscrew is inserted through the aligned holes, coupling the camera housing 100 to the mount such that the camera housing can pivotally rotate relative to the mount when the turnable handscrew is in a first unlocked position, and such that the camera housing is fixed in position relative to the mount when the turnable handscrew is in a second locked position.

With the advent of modern versatile cameras designed for use within a multitude of activities, such cameras including the GoPro® camera and other similar devices, there is a need for specialized camera mounts adapted to bring these devices into unique environments.

Of particular relevance is the environment of the ocean and other bodies of water, herein referred to as an "aquatic environment", wherein conventional means provide for mounting the camera housing to a structure, such as a surfboard, boat or similar structure. With these conventional camera mounts, the camera remains fixed to the structure and is incapable of adjustment such as panning, tilting and the like.

While participating in an aquatic activity, such as surfing, a user is introduced to a dynamic environment. In the example of surfing, the wave is constantly changing as it forms a crest and breaks, while the surfer is generally moving relative to the wave as well as shifting positions relative to the surf board. With a conventional static camera mount, much of this dynamic environment is not captured by the camera, resulting in substantially limited media.

There is a need for a camera mount for use in aquatic and other environments, wherein the mount is capable of providing the possibility of adjustments such as: tilt, pan, pedestal, dolly, trucking, or a combination thereof. With the hands often required of a user during many action sports activities, novel methods for integrating the camera mount with the body must be explored.

Moreover, with aquatic sports there is a need to ensure that vision and breathing are not obstructed. Accordingly, care needs to be taken to ensure that the mount would not impede or restrict breathing or vision.

SUMMARY

These and other limitations in the art are overcome with the introduction of the camera mouth mount as shown and described.

In various embodiments, the camera mouth mount includes a mouth piece coupled to a camera mount, such that video is obtained while holding the camera mouth mount in one's mouth, the mouth mount being coupled to a camera.

Various features of the camera mouth mount are further described in the appended detailed description of the preferred embodiments.

BRIEF DESCRIPTION OF THE DRAWINGS

FIG. 11 shows a right-side view of the rigid mouth mount structure of FIG. 9.

FIG. 12 shows a left-side view of the rigid mouth mount structure of FIG. 9.

FIG. 13 shows a top view of the rigid mouth mount structure of FIG. 9.

DETAILED DESCRIPTION OF THE PREFERRED EMBODIMENTS

Figure 1:
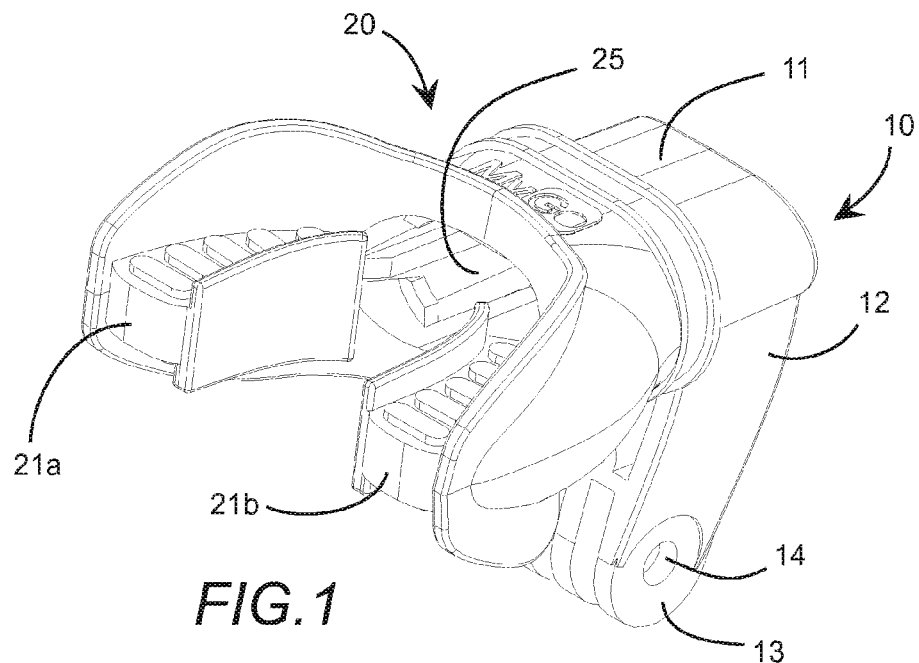
FIG. 1 shows a perspective view of a camera mouth mount in accordance with an embodiment including a pliable mouth guard engaged with a rigid mouth mount structure.

For purposes of explanation and not limitation, details and descriptions of certain preferred embodiments are hereinafter provided such that one having ordinary skill in the art may be enabled to make and use the invention. These details and descriptions are representative only of certain preferred embodiments, however, and a myriad of other embodiments which will not be expressly described will be readily obvious to those of skill in the art upon a thorough review hereof. Accordingly, any reviewer of the instant disclosure should interpret the scope of the invention by the claims, and such scope shall not be limited by the embodiments disclosed herein.

For purposes of this disclosure, the term "mouthpiece" is herein defined as a part of an instrument that goes in the mouth or to which the mouth is applied.

The term "mouth guard" is herein defined as a soft, plastic, intraoral appliance that covers all the occlusal surfaces of the teeth. For purposes herein, a mouth guard is a subspecies of a mouth piece. That is, a mouth guard is a mouth piece, but a mouth piece is not necessarily a mouth guard. A mouth guard is pliable whereas a mouth piece may be rigid. In certain embodiments herein, a mouthpiece is covered with a pliable mouth guard for ergonomic comfort and increased gripping leverage.

The term "air channel" is herein defined as a structural path configured to direct the communication of air flow.

The term "bite support" is herein defined as a portion of a mouthpiece including a longitudinal portion of material configured to rest between a left or a right side of a user's bite when the mouthpiece is held in the user's mouth.

The term "bite tab" is herein defined as a portion of a mouth guard including a longitudinal portion of material configured to rest between a left or right side of a user's teeth when the mouth guard is held in the user's mouth. Note that as used herein a "bite tab" is a subspecies of a "bite support" such that a bite tab of a mouth guard is a type of bite support; whereas a bite support is not necessarily a bite tab except where it forms part of a mouth guard, which is pliable.

In a general embodiment, a camera mouth mount includes: a mouthpiece having a pair of bite supports extending from a proximal end to a distal end wherein the bite supports are connected at the distal end, and a camera mount coupled to the mouthpiece.

In a preferred embodiment, the camera mount comprises: one or more first protrusions, each of the first protrusions having a hole extending therethrough, wherein the first protrusions are configured to interlock with one or more second protrusions of a camera housing. Each of said second protrusions of the camera housing also having a hole extending therethrough. In this regard, the holes of the first protrusions are configured to align with the holes of the second protrusions, wherein the aligned holes of the first and second protrusions are configured to receive a turnable handscrew extending therethrough for securing the camera housing to the camera mount.

In certain embodiments, a vertical support can be implemented between the base and the camera mount such that the camera mount is coupled to the base via the vertical support extending therebetween.

Now turning to the drawings, FIG. 1 shows a perspective view of a camera mouth mount in accordance with an embodiment including a pliable mouth guard 20 engaged with a rigid mouth mount structure 10. The pliable mouth guard comprises a first bite tab 21a and a second bite tab 21b collectively defining a pair of opposing bite tabs. The rigid mouth mount structure comprises a base 11, a vertical support 12 extending downwardly from the base, and one or more protrusions 13 formed at a terminal end of the vertical support, each of the protrusions configured with a hole extending therethrough. The camera mouth mount is shown with an air channel 25 extending through the mouth guard and underneath the base and vertical support of the rigid mouth mount structure. The air channel is configured to facilitate breathing during use, wherein the air channel is adapted for communication of air therein.

Figure 2:
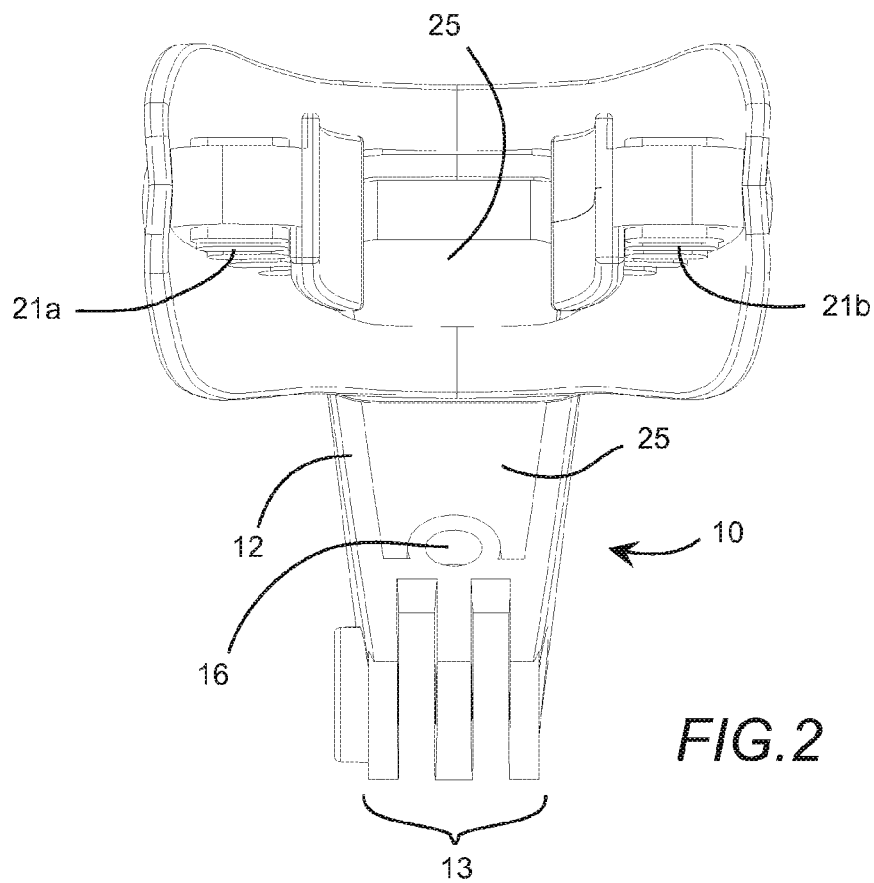
FIG. 2 shows a rear view of the camera mouth mount of FIG. 1.

FIG. 2 shows a rear view of the camera mouth mount of FIG. 1. The pliable mouth guard is shown with each of the first and second bite tabs 21a; 21b, respectively. The rigid mouth mount support 10 is shown with the vertical support 12 extending downwardly from the mouth guard. An aperture 16 extends through the vertical support 12 and can be used to attach an accessory such as a lanyard. Three protrusions 13 are shown extending from the vertical support. With this example, the protrusions 13 form the camera mount portion that is coupled to the mouthpiece. The air channel 25 is further illustrated as extending through the mouth guard and underneath the base and further along the vertical support along a rear side thereof. Note that the vertical support is sealed at a front side thereof to prevent water from entering the air channel with use of the camera mouth mount in an aquatic environment.

Figure 3:
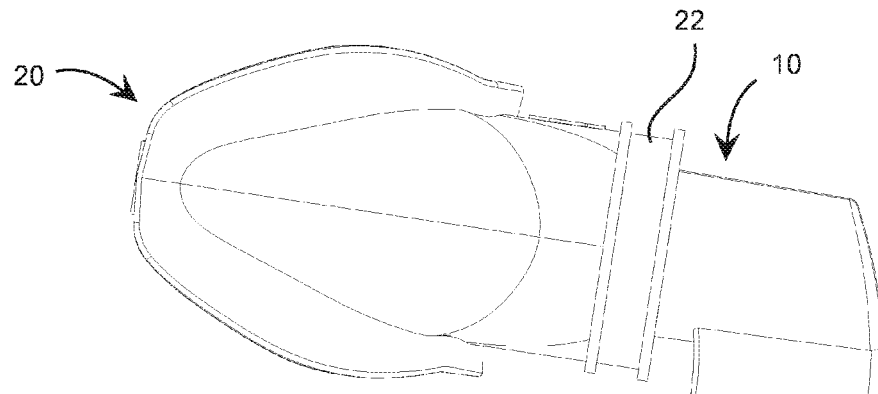
FIG. 3 shows a left-side view of the camera mouth mount of FIG. 1.

FIG. 3 shows a left-side view of the camera mouth mount of FIG. 1, including a pliable mouth guard 20 engaged with a rigid mouth mount structure 10. The pliable mouth guard is shown with a sleeve groove 22 adapted to mate or nest with the rigid mouth mount structure. A zip-tie or band can be used to further secure the mouth guard to the rigid mouth mount structure; however, with a pliable mouth guard having sufficient elasticity a zip-tie or band may not be required assuming there is sufficient friction provided by the elasticity of the mouth guard. A side view of the vertical support 12 and protrusion 13 is shown. The protrusion is shown having a hole 14 extending therethrough.

Figure 4:
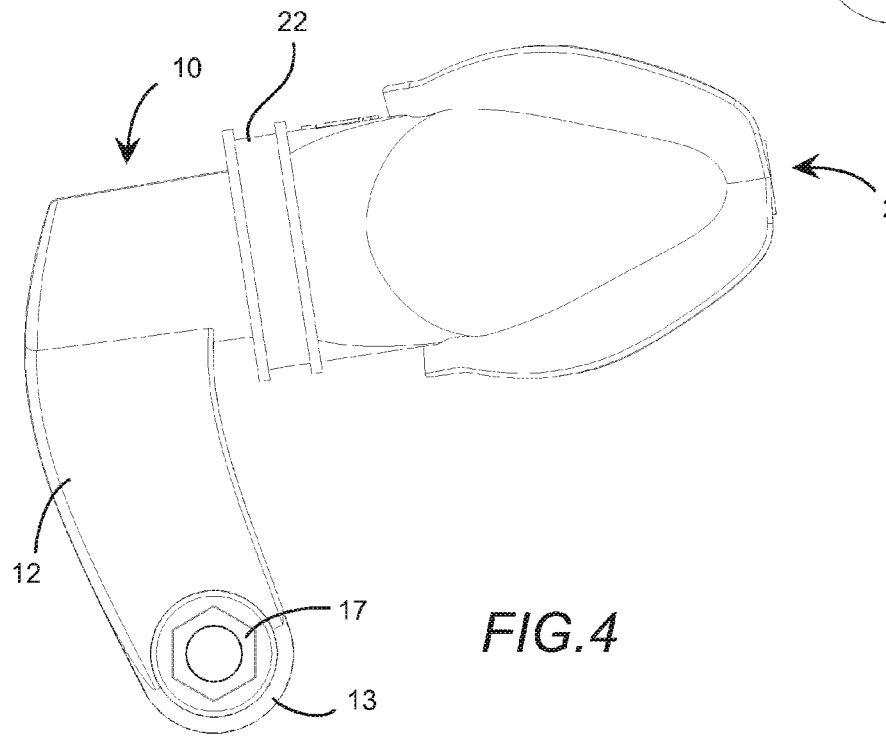
FIG. 4 shows a right-side view of the camera mouth mount of FIG. 1.

FIG. 4 shows a right-side view of the camera mouth mount of FIG. 1, which is substantially similar to the left-side view but in opposite configuration, however, a nut 12 is shown being disposed on the right-side of the rigid mouth mount structure at the aperture 12. The nut 12 can be positioned on either side. The nut is used to receive a portion of a threaded handscrew used to tighten the interlocked first protrusions of the camera mount portion and second protrusions of the camera housing.

Figure 5:
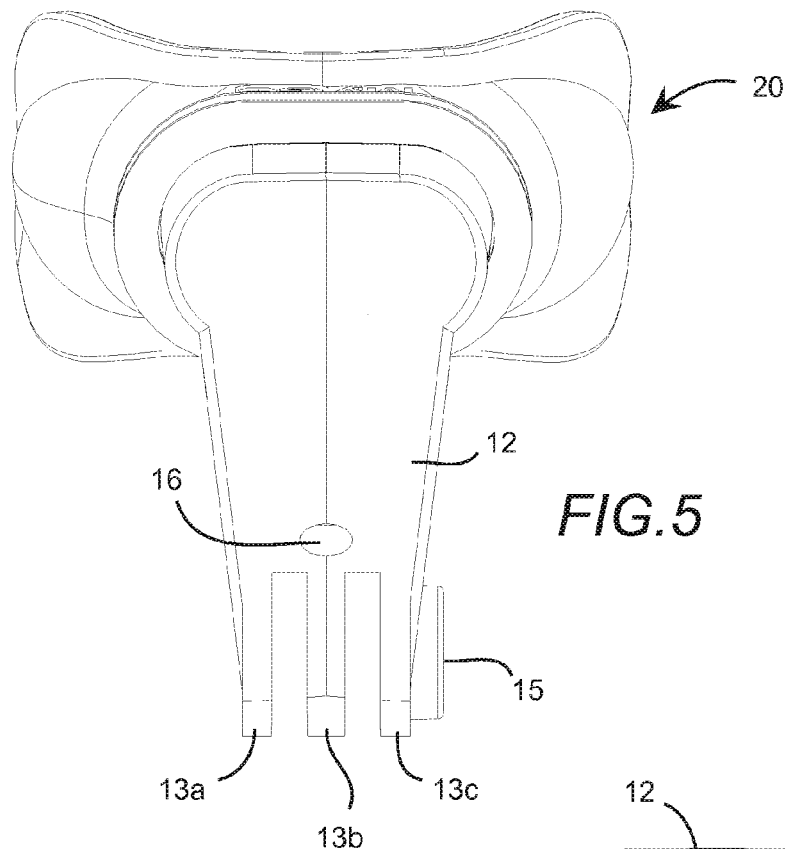
FIG. 5 shows a front view of the camera mouth mount of FIG. 1.

FIG. 5 shows a front view of the camera mouth mount of FIG. 1. The pliable mouth guard 20 is shown being engaged with the rigid mouth mount structure. The vertical support 12 is shown extending downwardly from the mouth guard. An aperture 16 is shown extending through the vertical support 12. The camera mount comprises a first protrusion 13a, a second protrusion 13b, and a third protrusion 13c. The nut is shown as being disposed at the third protrusion; however, as indicated above the nut can be disposed on either side or no nut can be provided, for example where the holes are threaded or in other similar variations.

Figure 6:
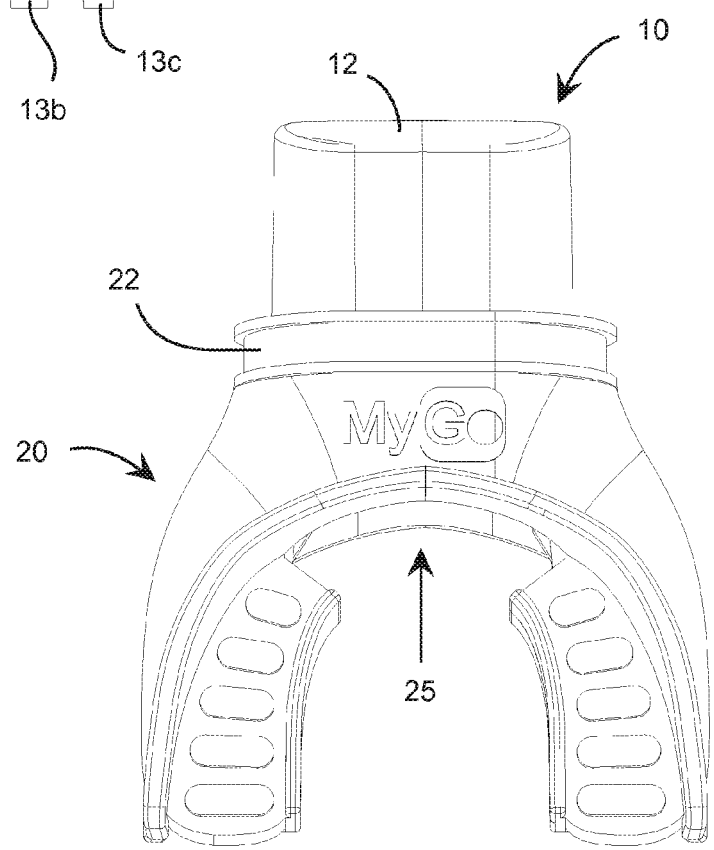
FIG. 6 shows a top view of the camera mouth mount of FIG. 1.

FIG. 6 shows a top view of the camera mouth mount of FIG. 1. The camera mouth mount includes a pliable mouth guard 20 having a sleeve groove 22 disposed at a distal end (front side) thereof. The camera mouth mount further includes a rigid mouth mount structure 10 having a vertical support extending downward about a front side thereof. An air channel 25 is shown extending through the mouth guard.

Figure 7:
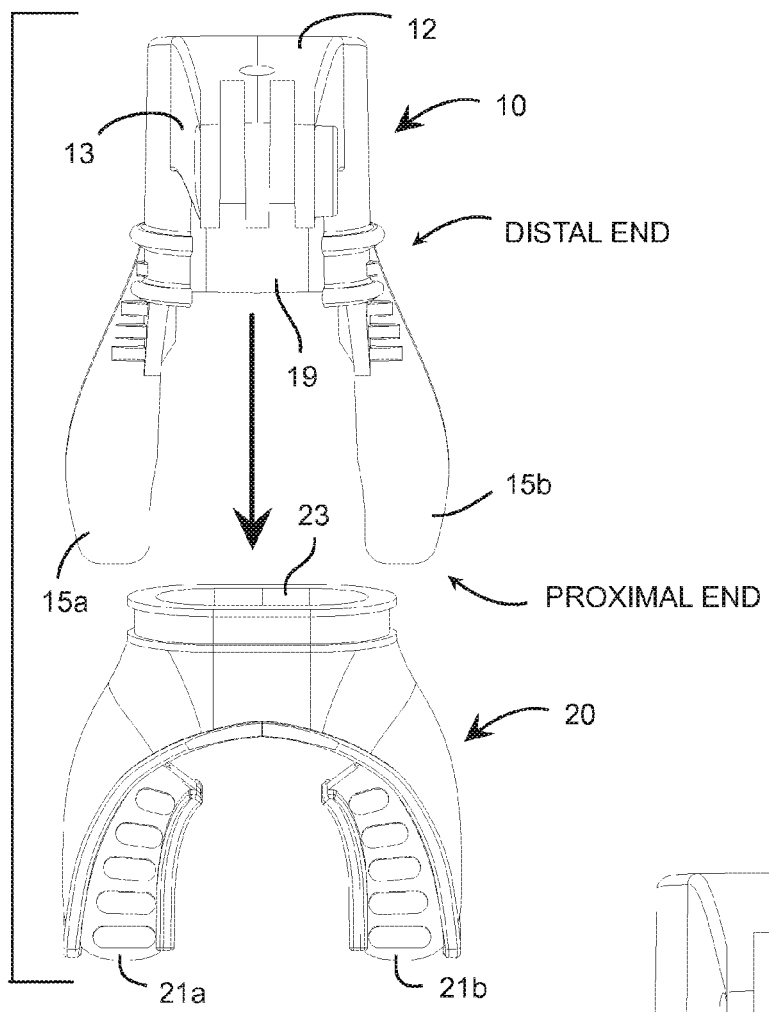
FIG. 7 shows an exploded bottom view of the camera mouth mount of FIG. 1.

FIG. 7 shows an exploded bottom view of the camera mouth mount of FIG. 1. As depicted, a portion of the rigid mouth mount structure 10 is inserted into the pliable mouth guard 20. The rigid mouth mount structure is shown comprising a first bite support 15a and a second bite support 15b, collectively referred to as a pair of opposing bite supports, each extending from a proximal end to a distal end, wherein the first and second bite supports are joined at a junction 19 disposed at the distal end. The rigid mouth mount structure further comprises a vertical support 12 and one or more protrusions 13 extending from the vertical support. The pliable mouth guard 20 is shown comprising a first bite tab 21a and a second bite tab 21b, collectively referred to as a pair of bite tabs, and a sleeve portion 23. The pliable mouth guard comprises a pair of slotted channels extending within a volume of each bite tab, wherein a bite support is inserted into the slotted channel volume of the bite tab portion of the mouth guard.

Figure 8:
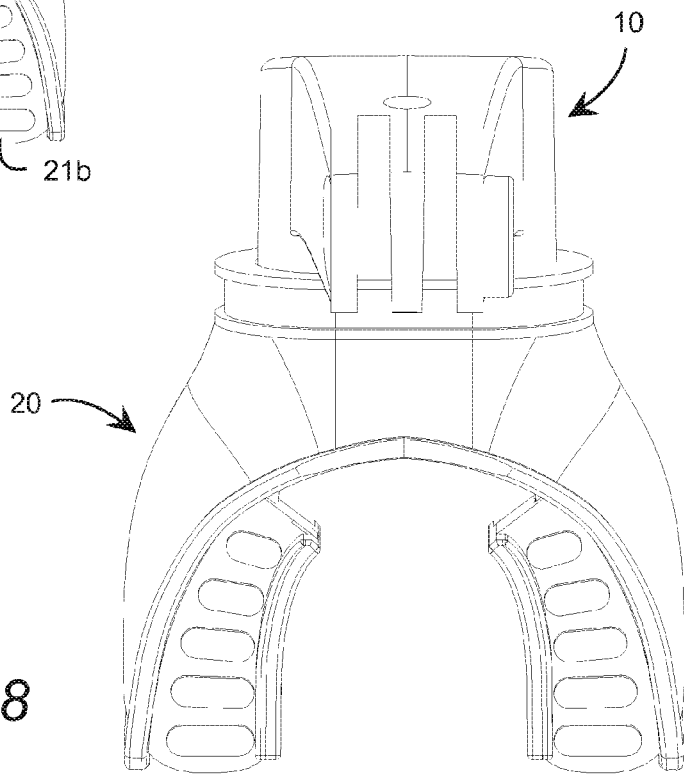
FIG. 8 shows a bottom view of the assembled camera mouth mount of FIG. 7.

FIG. 8 shows a bottom view of the assembled camera mouth mount of FIG. 7. Assembly of the camera mouth mount is completed upon inserting the rigid mouth mount structure 10 into the pliable mouth guard 20 as shown in FIG. 7.

Figure 9:
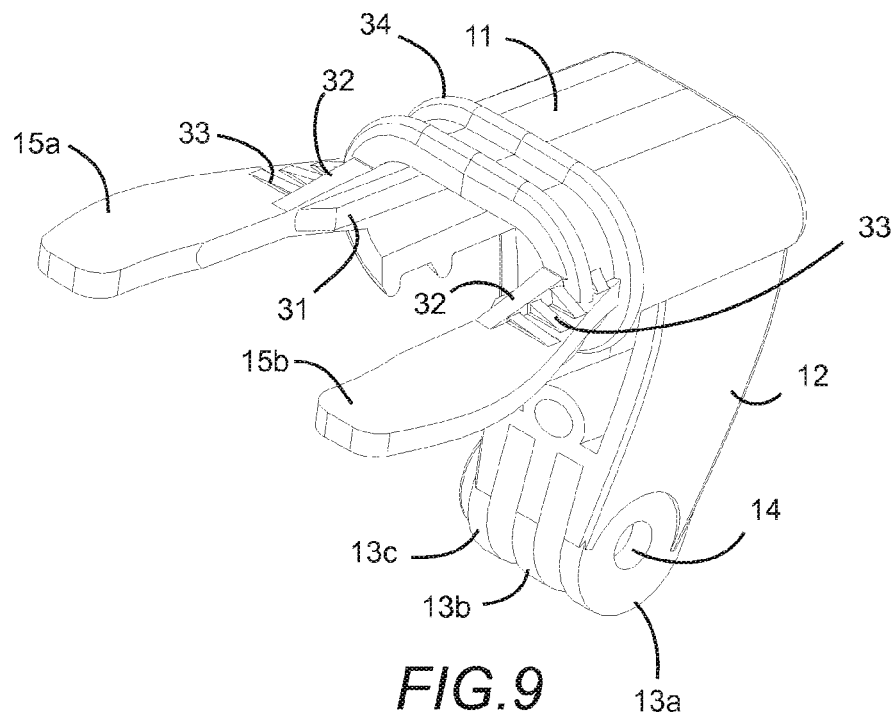
FIG. 9 shows a perspective view of a rigid mouth mount structure in accordance with an embodiment.

FIG. 9 shows a perspective view of a rigid mouth mount structure in accordance with an embodiment. The rigid mouth mount structure 10 comprises a first bite support 15a and a second bite support 15b, collectively referred to as a pair of opposing bite supports, each of the bite supports extending from a proximal end to a distal end within a common horizontal plane, wherein the first and second bite supports are connected at a junction disposed at the distal end. The junction extends further to form a base 11, and a vertical support 12 is shown extending downwardly from the base 11. Each of the bite supports is coupled to the base and reinforced structurally by a chamfer 32 extending therebetween. A support rail 31 is shown extending along at least a portion of the base 11 and further along a portion of the respective bite support 15a. For additional structural support, a plurality of support ribs 33 are provided each extending between the respective bite support 15a; 15b and chamfer 32. The ribs are shown as being oriented perpendicular to the chamfers; however, a diagonal alignment or other orientation of the ribs with respect to the chamfers can be similarly implemented. Protrusions 13a; 13b; 13c are shown extending from the vertical support 12. Each protrusion 13 is configured with a hole 14 extending therethrough.

Figure 10:
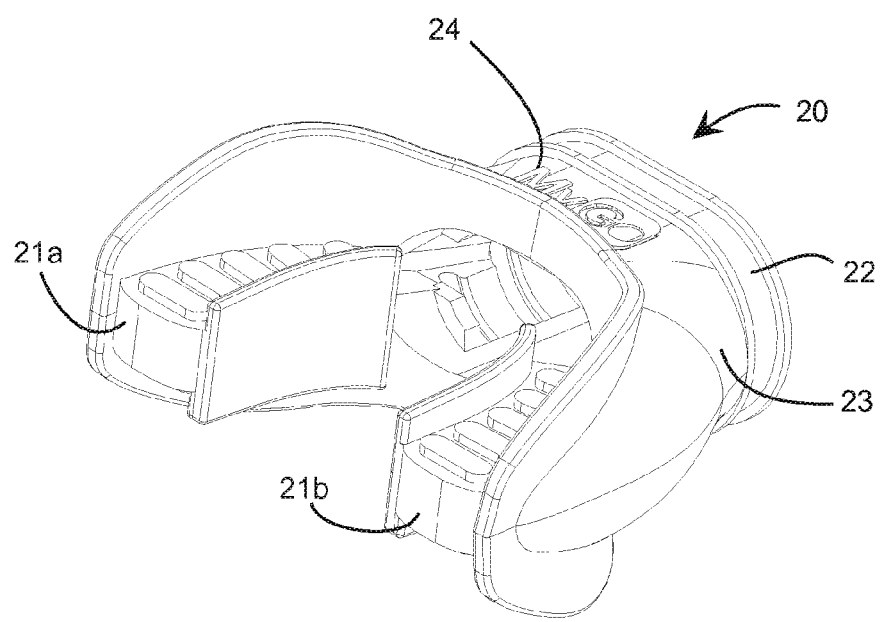
FIG. 10 shows a rear perspective view of a pliable mouth guard in accordance with an embodiment.

FIG. 10 shows a rear perspective view of a pliable mouth guard in accordance with an embodiment. The pliable mouth guard 20 is shown with a first bite tab 21a and a second bite tab 21b extending from a sleeve portion 23. A circumferential sleeve groove 22 is provided, wherein a zip-tie, band, or other similar element can be received for tightening the pliable mouth guard against the rigid mouth mount support. The pliable mouth guard 20 is shown with an optional logo 24 disposed on a top surface thereof.

FIG. 11 shows a right-side view of the rigid mouth mount structure of FIG. 9. The rigid mouth mount support 10 comprises a base 11 having a vertical support 12 extending downwardly therefrom toward a terminal end, wherein one or more protrusions 13 are disposed at the terminal end of the vertical support. A nut 17 is shown optionally fixed to the protrusion 13 on the right side. The rigid mouth mount support further comprises a sleeve channel 35 and a first and second circumferential rim 34a; 34b, respectively, each disposed on either side of the sleeve channel. The sleeve portion of the pliable mouth mount is configured to nest about the sleeve channel and circumferential rims. As discussed above, a zip-tie, band or other means can be utilized to secure the pliable mouth guard about the sleeve channel of the rigid mouth mount structure. Also shown is the first bite support 15a extending from the base of the rigid mouth mount structure, and a first chamfer 32a disposed between the base 11 and a top surface of the first bite support 15a. Furthermore, a second chamfer 32b is shown disposed between the base 11 and a bottom surface of the first bite support 15a.

FIG. 12 shows a left-side view of the rigid mouth mount structure of FIG. 9. The left-side view of the rigid mouth mount structure 10 is substantially similar to the right-side as discussed above. No nut is shown on the left-side at the hole 14; however the nut can be configured on either side or not at all depending on the manufacturer preferences. Now, as seen in FIGS. 11-12, the rigid mouth mount structure 10, in accordance with the illustrated embodiment, includes: a base 11, the base including a circumferential rim 34 extending radially outward from the base, a pair of opposing bite supports 15a; 15b, each of the bite supports extending longitudinally from the base in a direction perpendicular with respect to the circumferential rim, each of the opposing bite supports with a first height H1 at a connection with the circumferential rim and a second height H2 at a proximal end opposite said base, wherein the first height is greater than the second height, and one or more protrusions 13 coupled to the base, wherein the one or more protrusions are configured to interlock with one or more features of camera housing.

FIG. 13 shows a top view of the rigid mouth mount structure of FIG. 9. The rigid mouth mount structure 10 is shown comprising a base 11 and a pair of bite supports 15a; 15b extending from the base. Each bite support is structurally reinforced with the addition of an optional support rail 31, one or more chamfers 32, and up to a plurality of support ribs 33. The support rail extends along at least a portion of the base and further along at least a portion of the bite support. The chamfers extend between the base and the bite support, generally at an angle therebetween. The ribs are shown being oriented perpendicular with respect to each chamfer; however, an alternative orientation may be similarly implemented.

Figure 14:
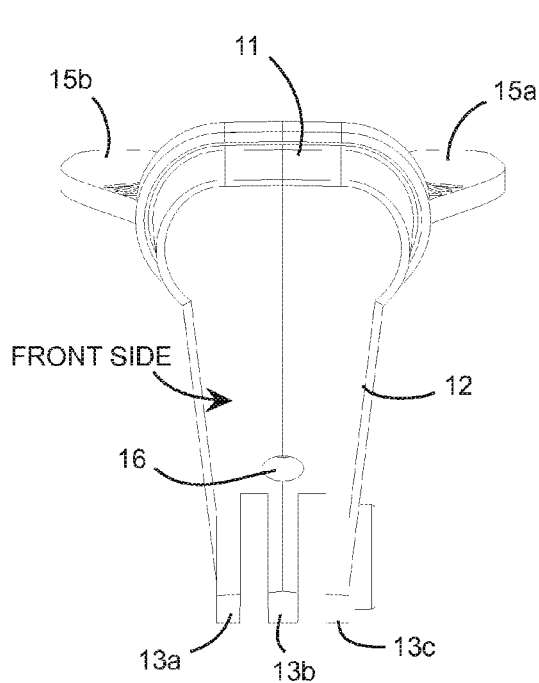
FIG. 14 shows a front view of the rigid mouth mount structure of FIG. 9.

FIG. 14 shows a front view of the rigid mouth mount structure of FIG. 9. The rigid mouth mount support comprises a pair of bite supports 15a; 15b extending from the base 11. A vertical support extends downwardly from the base toward a terminal end thereof. One or more protrusions 13a; 13b; 13c are disposed at the terminal end of the vertical support 12. An aperture 16 is shown extending through the vertical support 12. The front side of the vertical support is sealed in front of the air channel for preventing communication of materials therein.

Figure 15:
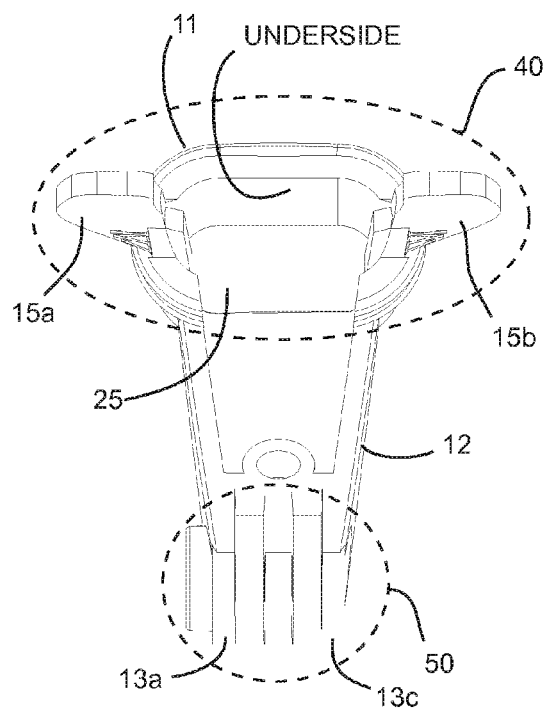
FIG. 15 shows a rear view of the rigid mouth mount structure of FIG. 9.

FIG. 15 shows a rear view of the rigid mouth mount structure of FIG. 9. Here, the first and second bite supports 15a; 15b are shown extending from the base 11 forming a mouthpiece 40. An air channel 25 is shown extending along an underside of the base and behind the vertical support 12. The vertical support extends downwardly from the base 11 toward a terminal end. Protrusions 13a and 13c form a camera mount 50 disposed at the terminal end. In this regard, the rigid mouth mount structure includes a mouthpiece coupled to a camera mount. The pliable mouth guard is not required to be attached to the rigid mouth mount structure; however, ergonomics and stability are greatly enhanced with the inclusion of a pliable mouth guard as illustrated above.

Figure 16:
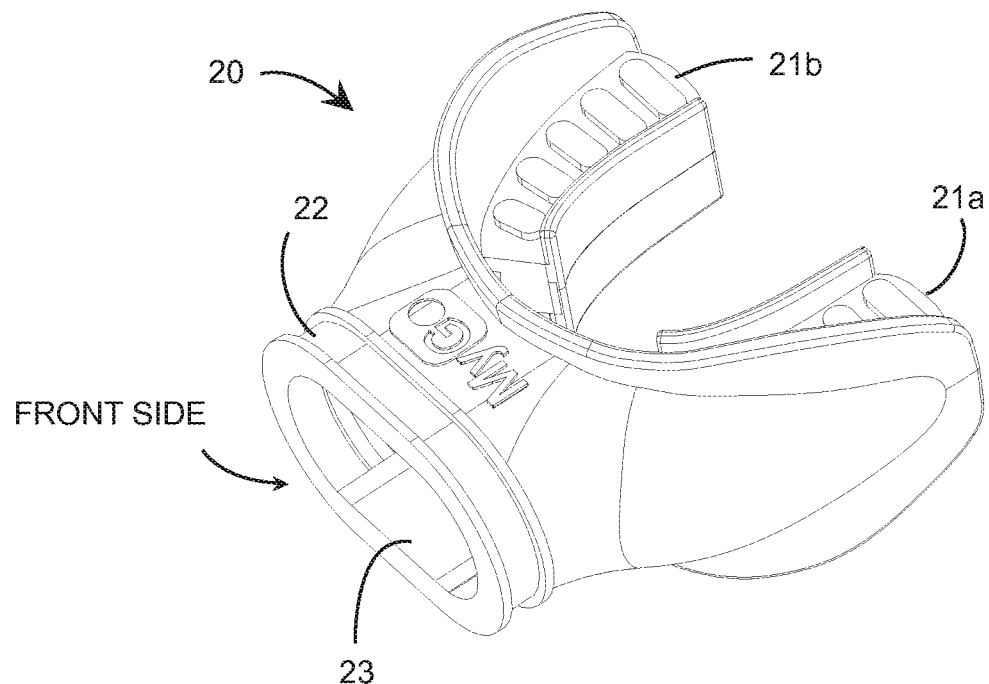
FIG. 16 shows a top perspective view of a pliable mouth guard in accordance with an embodiment.

FIG. 16 shows a top perspective view of a pliable mouth guard 20 in accordance with an embodiment. The pliable mouth guard comprises a first bite tab 21a and a second bite tab 21b, each extending from a sleeve portion 23. The mouth guard further comprises a sleeve groove 22 disposed at a front side of the mouth guard.

Figure 17:
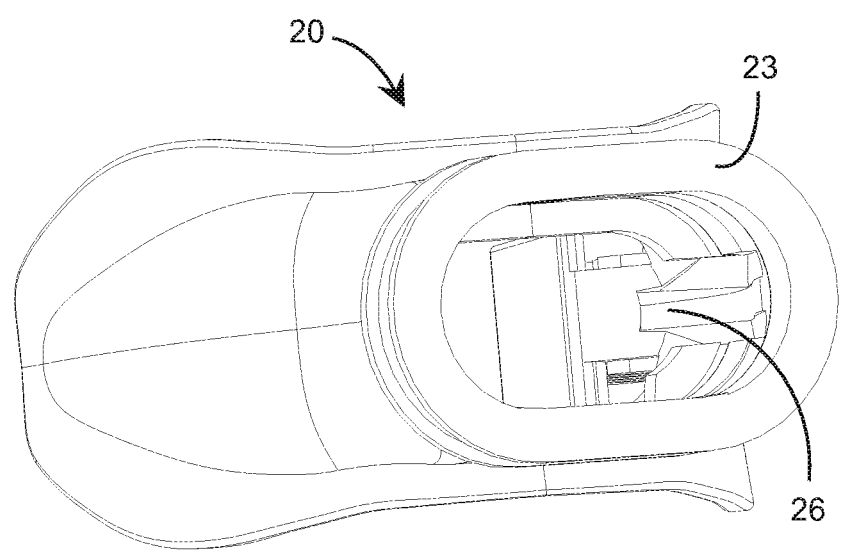
FIG. 17 shows a front perspective view of a pliable mouth guard in accordance with an embodiment.
Figure 18:
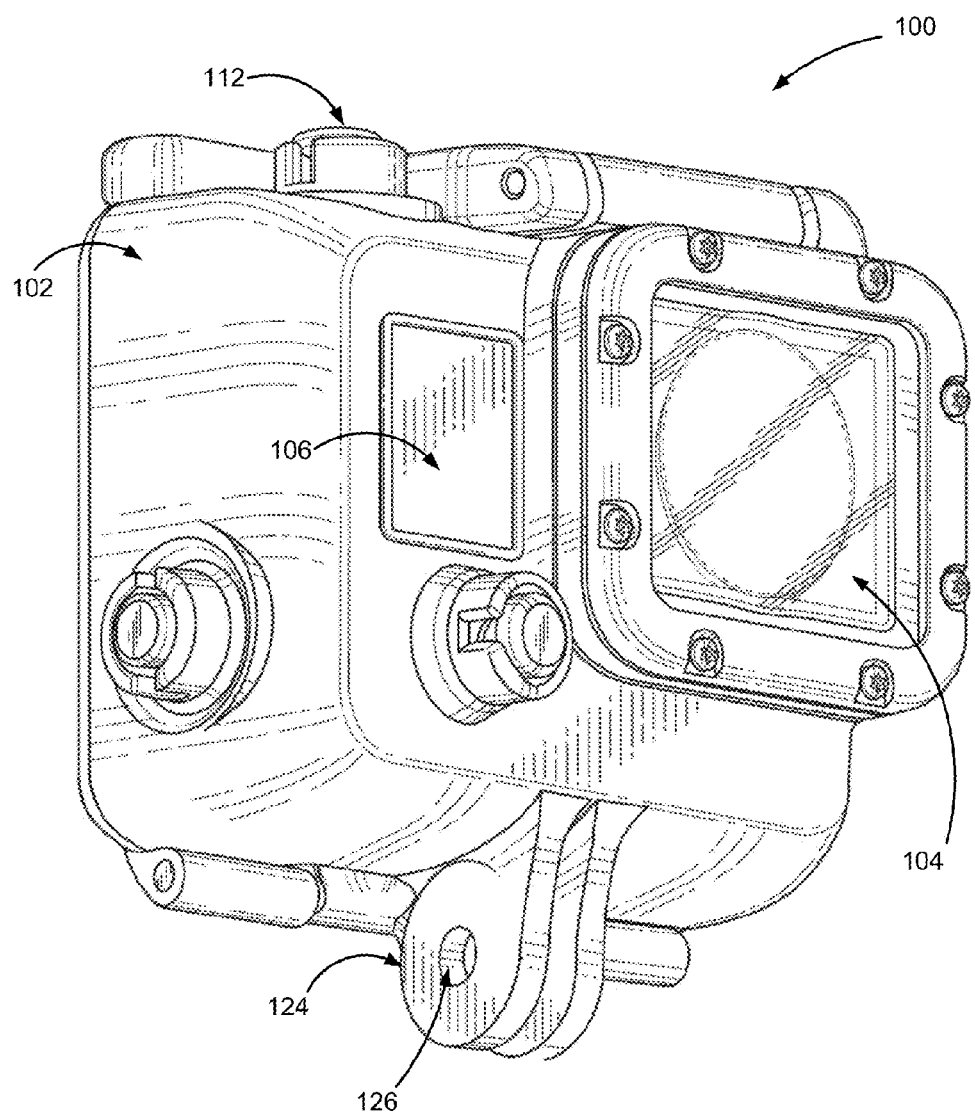
FIG. 18 shows a conventional camera housing in accordance with the prior art.

FIG. 17 shows a front perspective view of a pliable mouth guard in accordance with an embodiment. The pliable mouth guard is shown from a perspective illustrating the sleeve portion 23 and slotted volume 26. Each of the bite tabs comprises a hollow slotted volume extending therein, the slotted volume 26, wherein a respective bite support of the rigid mouth mount structure is received within the slotted volume upon mating the mouth guard and the rigid mouth mount structure.

In certain embodiments, a lanyard made of a loop of string, rope, cord or other filament is provided. The lanyard can be attached by tying a portion thereof through an aperture extending through the vertical support of the camera mouth mount.

A float, made of foam or similar material configured to float in water, is optionally provided with the camera mouth mount kit. The float can be attached to either the mount or the camera housing.

The rigid mouth mount support can be carved, molded or cast from a variety of materials including wood, metal and plastic. In a preferred embodiment, the rigid mouth mount structure is molded using a rigid plastic such as polyurethane, polycarbonate or other plastic material. In this regard, it is preferable to manufacture the rigid mouth mount structure as a monolithic unitary piece of material for maximum structural integrity.

The mouth guard is preferably molded from a pliable plastic material, although a myriad of pliable and non-pliable materials may be used.

The bite supports can be optionally designed for added structural enhancement by including one or more of the optional support rails, chamfers, and support ribs. Although certain examples are illustrated, those with skill in the art will recognize that a multitude of variations can be similarly implemented without departing from the spirit and scope of the invention.

Although the illustrated embodiments show the use of a pliable mouth guard configured to receive rigid bite supports within a slotted volume of the bite tabs, other embodiments can utilize a similar pliable mouth guard, with a sleeve portion thereof being coupled to the base, without such rigid extended bite support tabs. Accordingly, in certain embodiments a mouth piece may simply be attached to a base via a sleeve portion nested thereon without the use of rigid bite supports enclosed within the a slotted volume of the bite tabs of the mouth guard.

Other configurations, variations, and other embodiments will be understood by those having skill in the art.

REFERENCE SIGNS LIST

(10) rigid mouth mount structure
(11) base
(12) vertical Support
(13) mount protrusions (first protrusions)
(14) hole
(15) bite support
(16) aperture
(17) nut
(19) junction
(20) pliable mouth guard
(21) bite tab
(22) sleeve groove
(23) sleeve portion
(24) logo
(25) air channel
(26) slotted volume
(31) support rail
(32) chamfer
(33) support ribs
(34) circumferential rim
(35) sleeve channel
(40) mouthpiece
(50) camera mount
(100) camera housing
(102) first housing portion REFERENCE SIGNS LIST
-continued (104) lens window
(106) indicator window
(112) outer shutter button
(124) housing protrusions (second protrusions)
(126) hole

What is claimed is:

1. A camera mouth mount, comprising:
a rigid mouth mount structure including:
a base, the base including a circumferential rim extending radially outward therefrom,
a pair of opposing bite supports, each of the bite supports extending longitudinally from said base in a direction perpendicular with respect to the circumferential rim, each of said opposing bite supports having a first height at a connection with the circumferential rim and a second height at a proximal end opposite said base, wherein the first height is greater than the second height, and
one or more protrusions coupled to the base, wherein said one or more protrusions are configured to interlock with one or more features of a camera housing; and
a pliable mouth guard configured to couple with the rigid mouth mount structure, the pliable mouth guard including:
a pair of bite tabs, wherein each of the bite tabs further includes a slotted volume therein, and wherein each slotted volume of the respective bite tabs is configured to receive at least a portion of one of the opposing bite supports of the rigid mouth mount structure;
wherein the pliable mouth guard is configured to couple with the rigid mouth mount structure at a mating of the slotted volumes and respective bite supports engaged therewith.

2. The camera mouth mount of claim 1, said pair of opposing bite supports including:
a first bite support and a second bite support;
wherein at least a portion of each of said first and second bite supports are disposed within a common horizontal plane.

3. The camera mouth mount of claim 2, further comprising one or more support rails, each of said support rails extending along said base and further extending about at least a portion of one of said first and second bite supports.

4. The camera mouth mount of claim 1, said bite supports including one or more chamfers, wherein each of the chamfers is configured to provide rigid support at the connection of one of the bite supports and the circumferential rim of the base.

5. The camera mouth mount of claim 4, comprising a first chamfer disposed between said first bite support and said base along a top surface of the first bite support.

6. The camera mouth mount of claim 5, comprising a second chamfer disposed between said first bite support and said base along a bottom surface of the bite support.

7. The camera mouth mount of claim 4, comprising a plurality of chamfers, wherein each of said chamfers individually connects the base with one of the first and second bite supports.

8. The camera mouth mount of claim 7, further comprising a plurality of support ribs, wherein each of said support ribs extends perpendicular with respect to one of said chamfers along a width of one of said first and second bite supports.

9. The camera mouth mount of claim 1, said one or more protrusions being coupled to the base via a vertical support extending therebetween; the mouth mount further comprising an aperture extending through the vertical support for attaching a lanyard.

10. The camera mouth mount of claim 9, said base and said vertical support extending therefrom being configured with an air channel extending about an underside thereof.

11. The camera mouth mount of claim 10, wherein a front face of the vertical support is configured for preventing communication of liquids into the air channel.

12. The camera mouth mount of claim 1, said pliable mouth guard comprising: a sleeve portion configured at a front side of the mouth guard, wherein said sleeve portion is configured to nest with at least a portion of said base.

13. A camera mouth mount kit, comprising:
a rigid mouth-mount structure; and a pliable mouth guard; said rigid mouth-mount structure including:
a pair of opposing bite supports extending from a proximal end to a distal end wherein said bite supports are connected at a base disposed at the distal end, the base further comprising an air channel disposed adjacent the base, and one or more support rails coupled to at least a portion of the base within the air channel, the support rails being adapted to provide rigid support of the base and corresponding rigid mouth mount structure,
a vertical support extending downwardly from the pair of bite supports at the junction thereof, and
one or more protrusions extending from the vertical support, wherein said one or more protrusions are configured to interlock with one or more features of a camera housing for attachment therewith; and
said pliable mouth guard including:
a sleeve portion configured at a front side of the mouth guard, and a pair of bite tabs coupled to the sleeve portion; wherein said sleeve portion is configured to nest with at least a portion of the rigid mouth-mount structure at said junction, and wherein each of said bite tabs is configured to receive and engage one of said bite supports within a slotted volume thereof.

14. The camera mouth mount kit of claim 13, with said rigid mouth-mount structure further comprising an aperture extending through the vertical support; the kit further comprising a lanyard configured to attach to the rigid mouth-mount structure at said aperture.

15. The camera mouth mount kit of claim 13, further comprising a float configured to attach with the camera housing.

16. A camera mouth mount kit, comprising:
a rigid mouth-mount structure; and
a pliable mouth guard configured to couple with the rigid mouth mount structure; characterized in that:
the rigid mouth mount structure includes:
a base, wherein the base further comprises an air channel disposed adjacent to the base, and one or more support rails coupled to at least a portion of the base within the air channel, the support rails being adapted to provide rigid support of the base and corresponding rigid mouth mount structure; and
one or more protrusions coupled to the base, wherein said one or more protrusions are configured to interlock with one or more features of a camera housing;
and
the pliable mouth guard includes:
a sleeve portion configured to couple with at least a portion of the base for attaching the pliable mouth guard to the rigid mouth mount structure.

17. The camera mouth mount kit of claim 16, wherein the base and the one or more protrusions of the rigid mouth mount structure form a monolithic piece.

18. The camera mouth mount kit of claim 17, wherein the sleeve portion is configured to slide over and receive said at least a portion of the base.

19. The camera mouth mount kit of claim 18, wherein the pliable mouth guard further comprises a sleeve groove disposed about an outer surface of the sleeve portion, the sleeve groove being adapted to receive a securing element for securing the mouth guard about the rigid mouth mount structure, the securing element comprising one of: a zip tie or band.

20. The camera mouth mount kit of claim 16, wherein said rigid mouth mount structure further comprises at least one circumferential rim extending about at least a portion of a circumference associated with the base, and a sleeve channel disposed adjacent to the at least one circumferential rim, wherein the sleeve portion of the pliable mouth guard is adapted to couple with the base of the rigid mouth mount structure at the sleeve channel.

21. The camera mouth mount kit of claim 20, wherein one or more of the at least one circumferential rim extends radially outwardly from the base.

22. The camera mouth mount kit of claim 16, further comprising a lanyard configured to couple with the rigid mouth mount structure, and a float including a foam body configured to attach to one of: the rigid mouth mount structure or said camera housing.

* * * * *